United States Patent [19]

Marten et al.

[11] Patent Number: 5,319,004
[45] Date of Patent: Jun. 7, 1994

[54] HARDENER FOR EPOXY RESINS COMPRISING REACTION PRODUCTS OF POLYAMIDOAMINES, SECONDARY POLYAMINES AND EPOXY-POLYOL ADDUCTS

[75] Inventors: Manfred Marten, Mainz; Bernhard Stengel-Rutkowski, Wiesbaden; Claus Godau, Kiedrich, all of Fed. Rep. of Germany

[73] Assignee: Hoechst Aktiengesellschaft, Fed. Rep. of Germany

[21] Appl. No.: 24,195

[22] Filed: Feb. 26, 1993

[30] Foreign Application Priority Data

Feb. 29, 1992 [DE] Fed. Rep. of Germany ....... 4206392

[51] Int. Cl.$^5$ .................. C08G 59/18; C08L 63/00
[52] U.S. Cl. ..................... 523/404; 523/414; 523/417; 523/420; 525/526; 525/533; 528/111; 564/152; 564/153; 564/157; 564/158; 564/159; 564/201; 564/202; 564/203
[58] Field of Search ........... 523/404, 414, 417, 420; 525/526, 533; 528/111; 564/157, 158, 159, 153, 152, 201, 202, 203

[56] References Cited

U.S. PATENT DOCUMENTS

| | | | |
|---|---|---|---|
| 3,474,056 | 10/1969 | Schneider et al. | 528/99 |
| 5,017,675 | 5/1991 | Marten et al. | 528/111 |
| 5,039,721 | 8/1991 | Schwerzel et al. | 523/415 |

*Primary Examiner*—Frederick Krass
*Attorney, Agent, or Firm*—Bierman and Muserlian

[57] ABSTRACT

Hardeners for epoxy resins, comprising reaction products of (A) polyamidoamines that were obtained by polycondensation of (a) dicarboxylic acids containing oxyalkylene groups, or their derivatives, with (b) polyamines containing at least two amino groups capable of undergoing condensation with (a), (B) polyamines containing at least two secondary amino groups, and (C) adducts of (c) polyepoxy compounds and (d) polyalkylene polyether polyols.

Epoxy resins that have been cured with these hardeners exhibit in particular a very good water resistance.

10 Claims, No Drawings

HARDENER FOR EPOXY RESINS COMPRISING REACTION PRODUCTS OF POLYAMIDOAMINES, SECONDARY POLYAMINES AND EPOXY-POLYOL ADDUCTS

Epoxy resins, in particular those prepared from bisphenol A and epichlorohydrin, are known raw materials for the preparation of high-grade casting resins and coating compounds. These aromatic epoxy resins hardened with polyamines have, besides a good resistance to chemicals and solvents, a good adhesive strength on many substrates. Bisphenol A epoxy resins that can be processed solvent-free and that have as low a viscosity as possible are particularly important, for example in the protection and restoration of concrete structures, as concrete additives (ECC field), for elastic adhesive systems in various application sectors, and for coating a wide range of substrates. The curing of the epoxy resins can take place at ambient temperature when using polyamines.

However, the applicability of the epoxy resin/polyamine systems is often limited by an insufficient elasticity or flexibility in the crosslinked state. In order to ensure a permanent bridging of cracks, coating materials are however required that can "work" over the crack by virtue of their high elasticity and can at the same time absorb large temperature shocks thanks to a high extensibility.

Moreover, elastic epoxy resin systems that exhibit a sufficient elasticity even at low temperatures (for example down to $-30°$ C.) are required in the adhesives sector. Furthermore, coatings must be able to withstand a severe deformation of the substrate without fracturing or cracking.

In principle the elasticity of epoxy resin systems can be improved externally by adding plasticizers or internally by reducing the crosslinking density. External elasticizers are however unreactive and are not incorporated into the thermosetting material network. External plasticizers that may be used include tar, phthalic acid esters, high boiling point alcohols, ketone resins, vinyl polymers and other products that do not react with epoxy resins and amine hardeners. This type of modification is however restricted only to specific application sectors since it has a number of disadvantages. For example, these additives interfere greatly with the thermoset structure, their plasticizing effect is restricted at low temperatures, and they tend to exhibit exudation under thermal stress and during ageing. Compounds that react with the epoxy resins or hardeners and that are incorporated in the crosslinking are added in order internally to increase the elasticity Specifically, the elasticizing action is achieved by incorporating long-chain aliphatic or highly branched additives, for example into the curing component. In practice the elasticity of the epoxy resin systems can thus be controlled to a certain extent by using specific hardeners. For example the conventional polyamines such as ethylenediamine, diethylenetriamine and triethylenetetramine can be converted into polyamidoamines by reaction with longer-chain, polybasic acids. These conventional hardeners, which have been used on a considerable scale for a long time, provide a satisfactory property spectrum of soft hardeners for epoxy resins, but do not satisfy the requirements for a tough and resilient epoxy resin system such as is necessary in many applications.

Furthermore, these epoxy resin hardener systems are to have a low viscosity. Since for environmental protection reasons solvents can often no longer be used, corresponding aqueous systems have to be prepared.

Polyamidoamines as hardeners for epoxy resins have already been described in DE-A 39 01 279. These polyamidoamines are obtained by polycondensation of (a) dicarboxylic acids containing oxyalkylene groups, or their derivatives, with (b) polyamines containing at least two amino groups capable of undergoing condensation with (a).

Highly elastic epoxy resin systems are obtained when using these known epoxy resin hardeners For end uses in which a dilution with water is necessary, and particularly in the processing with epoxy resin dispersions, the polyamidoamines of DE-A 39 01 279 can be used only to a limited extent since they are insufficiently compatible with water. Unsatisfactory application properties are found in those cases in which it is still possible to produce coatings from aqueous solution. It was accordingly the object of the present invention to provide hardeners and also curable mixtures containing the latter, based on epoxy resins, which do not exhibit the disadvantages of the known systems, or at least only do so to a reduced extent.

it has now been found that the hardeners according to the invention and described hereinafter for epoxy resins surprisingly do not exhibit these disadvantages. Curable materials based on these hardeners and compounds containing epoxy groups (epoxy resins) instead provide satisfactorily adhering coatings or adhesives, sheet-like structures, sealants, moldings and the like having high toughness and impact strength, high elasticity even at low temperatures, and also good crack-bridging properties.

In particular, these new hardeners exhibit an excellent compatibility with water, and may therefore be prepared as aqueous solutions and used to cure aqueous epoxy resin systems. There are no problems due to smell, toxicity and inflammability, thanks to the absence of organic solvents, and in addition all equipment that comes into contact with the hardener can be cleaned by washing with water. The coatings produced using the hardeners according to the invention exhibit outstanding paint properties.

The invention relates to hardeners for epoxy resins, comprising reaction products of
(A) polyamidoamines that were obtained by polycondensation of (a) dicarboxylic acids containing oxyalkylene groups, or their derivatives, with (b) polyamines containing at least two amino groups capable of undergoing condensation with (a),
(B) polyamines containing at least two secondary amino groups, and
adducts of (c) polyepoxy compounds and (d) polyalkylene polyether polyols.

The polyamidoamines (A) used in the preparation of the hardeners according to the invention and which preferably have a linear chain structure are known from DE-A 39 01 279. They contain on average at least 2, preferably 2 to 4, primary and/or secondary amino groups per molecule, of which at least one amino group is preferably primary. These polyamidoamines preferably contain 2 primary amino groups or 2 primary and 2 secondary amino groups. In principle polyamidoamines without primary amino groups, and containing for example 2 or more secondary amino groups, may also be used, though this variant is generally less advantageous.

The amine number is in general from 8 to 900, preferably from 50 to 500, and in particular from 100 to 400, mg KOH/g, while the acid number is generally 0.01 to 10, preferably 0.01 to 3, mg KOH/g. These polyamidoamines (A) furthermore have hydrogen active equivalents of in general 50 to 3500, preferably 50 to 500, and in particular 70 to 300, and also mean molecular weights $M_n$ (number average) of from 200 to 15,000, preferably 200 to 2500.

Depending on the nature of the starting components (a), (b) and their molar ratio and also on the molecular weight of (A), these polyamidoamines are low viscosity to high viscosity or solid products, which if desired may also be employed in an organic solvent or in water depending on their use.

The preparation of the polyamidoamines (A) is effected in a known manner by reacting the compounds (a) with the polyamines (b), for example by heating of the components for a number of hours with the exclusion of oxygen to temperatures of 125°-250° C., preferably 150°-190° C., first of all under normal atmospheric pressure and then if necessary under reduced pressure Reference is made in this connection to Sato, Iwabuchi, Böhmer and Kern (Makromol. Chem. 182, pp. 755-762 (1981)), Kern, Kämmerer, Böhmer and Bhagwat (Angewandte Makromolekulare Chemie 113, pp. 53-59 (1983)), Imai, Ogata, Kakimoto (Makromol. Chem., Rapid Commun. 5, 47-51 (1984)), and also DE-A 26 58 714, JP-A 84/1532 and EP-A 332 967.

The compounds (a) are dicarboxylic acids containing oxyalkylene, preferably oxyethylene, groups, or their derivatives that are reactive with (b), such as anhydrides, halides and in particular esters. These compounds (a) preferably have the formula (I)

$$R^2-OOC-CH_2-[O-R^1-]_nO-CH_2-COOR^2 \quad (I)$$

in which
  $R^1$ is a branched or unbranched alkylene radical having 2 to 5, preferably 2, carbon atoms;
  $R^2$ is, each independently of the others, hydrogen or a branched or unbranched alkyl radical having 1 to 6, preferably 1 to 3, carbon atoms;
  n is 0 or an integer from 1 to 300, preferably 1 to 50, and in particular 1 to 25.

Examples of compounds (a) are: 3,6-dioxaoctanedioc acid, 3,6,9-trioxaundecanedioc acid, polyglycolic diacid having a molecular weight of about 400, preferably of about 600, or mixtures of these acids.

The preparation of these compounds (a) is known (see for example DE-A 29 36 123) and is performed for example by oxidation of polyglycols in the presence of catalysts.

The compounds (a) may if desired also contain up to 40%, preferably up to 30%, of an aliphatic, cycloaliphatic or aromatic dicarboxylic acid or mixtures of these acids.

Examples of aliphatic dicarboxylic acids whose aliphatic radical generally contains 1 to 20, preferably 2 to 12, carbon atoms, include succinic acid, glutaric acid, adipic acid, suberic acid, azelaic acid, sebacic acid and dodecanoic acid. Suitable cycloaliphatic carboxylic acids whose cycloaliphatic radical generally contains 5 to 12, preferably 6 to 8, carbon atoms are for example the various cyclohexanedicarboxylic acid isomers, hexahydrophthalic acid and tetrahydrophthalic acid. As aromatic dicarboxylic acids, the following may for example be used: terephthalic acid, isophthalic acid, o-phthalic acid or various naphthalenedicarboxylic acids, for example 2,6-naphthalenedicarboxylic acid. Terephthalic acid is particularly preferred. Mixtures of the aromatic dicarboxylic acids may also be used.

Further suitable aromatic carboxylic acids are those of the type

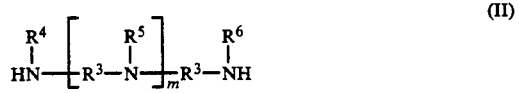

where X is a chemical bond, alkylene radicals having 1 to 6 carbon atoms, or O or CO.

The polyamines (b) that are reacted with the compounds (a) to form the polyamidoamines (A) have at least two amino groups capable of undergoing condensation with (a), of which preferably at least one is primary; it is particularly preferred if (b) contains 2 primary amino groups. Polyamines suitable for this purpose are for example those of the formula (II)

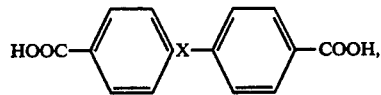

(II)

in which
  $R_3$ is, each independently of the others, a divalent hydrocarbon radical having 1 to 20, preferably 2 to 12 carbon atoms, preferably a branched or unbranched alkylene radical having 1 to 20, preferably 2 to 6, carbon atoms, a cycloalkylene radical having 5 to 12, preferably 6 to 10, carbon atoms, or an aralkylene radical having 7 to 12, preferably 8 to 10, carbon atoms;
  $R^4$, $R^5$, $R^6$ are, independently of one another, hydrogen, a hydrocarbon radical having 1 to 20, preferably 1 to 12, carbon atoms, preferably a branched or unbranched alkyl radical having 1 to 20, preferably 1 to 6, carbon atoms, a cycloalkylene radical having 5 to 12, preferably 6 to 10, carbon atoms, or an aralkylene radical having 7 to 12, preferably 8 to 10, carbon atoms, these radicals also being able to be interrupted by heteroatoms, or
  $R^4$ and $R^5$ are part of a preferably saturated ring system having 3 to 8, preferably 3 and 4, carbon atoms;
  m is 0 or an integer from 1 to 8, preferably 0 and 1 to 4.

Preferably $R^4$ and/or $R_6$ is hydrogen.

Examples of such polyamines (b) are: ethylenediamine, 1,2-diaminopropane, 1,3-diaminopropane, 1,3-diaminobutane, 1,4-diaminobutane, 1-amino-3-methylaminopropane, 2-methylpentamethylenediamine, pentamethylenediamine, hexamethylenediamine, trimethylhexamethylenediamine, neopentyldiamine, octamethylenediamine, cycloaliphatic diamines such as 1,2-, 1,3- or 1,4-cyclohexanediamine; 4,4'-methylenebiscyclohexylamine, isophoronediamine, menthanediamine, 4,4'-diamino-3,3'-dimethyldicyclohexylmethane, 3-aminomethyl-1-(3-aminopropyl-1-methyl)-4-methylcyclohexane,N-methylethylenediamine,N-aminoethylpiperazine, xylylenediamine, tricyclododecyldiamine, N-cyclohexylpropanediamine, methylbis(3-aminopropyl)amine, ethyl-bis(3-aminopropyl)amine, N-(3-aminopropyl)tetramethylenediamine, N,N'-bis(3- aminopropyl)tetramethylenediamine, polyalkylenepolyamines, such as 1,2-dipropylenetriamine, bis(3-aminopropyl)amine, 1,2-tripropylenetetramine, diethylenetriamine, triethylenetetramine and tetraethylenepentamine, the commercially available primary aliphatic polyoxypropylenediamines or -triamines, and also ether diamines such as 1,7-diamino-4-oxaheptane, 1,7-diamino-3,5-dioxaheptane, 1,10-diamino-4,7-dioxadecane, 1,10-diamino-4,7-dioxa-5-methyldecane, 1,11-diamino-4,8-dioxaundecane, 1,11-diamino-4,8-dioxa-5methylundecane, 1,12-diamino-4,9-dioxadodecane, 1,13-diamino-4,10-dioxatridecane, 1,13-diamino-4,7,10-trioxa-5,8-dimethyltridecane, 1,14-diamino-4,7,10-trioxatetradecane, 1,16-diamino-4,7,10,13-tetraoxahexadecane, and 1,20-diamino-4,17-dioxaeicosane. Particularly preferred are 2-methylpentanediamine, diethylenetriamine, triethylenetetramine, isophoronediamine, m-xylylenediamine and trimethylhexamethylenediamine. Mixtures of these amines can also be used.

For the hardeners according to the invention, polyamines (B) having at least two secondary amino groups which may be used are those that have been described hereinbefore under A(b).

The adducts (C) used in the preparation of the hardeners according to the invention are obtained from polyepoxy compounds (c) and polyalkylene polyether polyols (d) having a mean molecular weight of from 200 to 20,000, preferably by reacting c and d in the equivalent ratio of 2:(0.1 to 1.5).

Suitable catalysts for the preparation of the adducts (C) are strong inorganic and organic bases, for example sodium hydroxide, potassium hydroxide, lithium hydroxide, barium hydroxide, strontium hydroxide, alkali metal alcoholates such as sodium methylate, lithium methylate, sodium ethylate, potassium dodecylate and metal alcoholates of polyoxyalkylene polyols, the alkali metal salts of carboxylic acids, for example sodium stearate and lithium stearate, and also metal salts of alkanecarboxylic acids, for example tin octanate. Also suitable are quaternary ammonium compounds and strong inorganic and organic protonic acids, for example phosphoric acid, tetrafluoroboric acid and benzenesulfonic acid. In addition, Lewis acids may be used as catalysts. Examples that may be mentioned include zinc chloride, iron(III) chloride, aluminum chloride, tin(II) dichloride, tin(IV) tetrachloride, titanium(IV) tetrachloride, titanium(IV) tetraisopropylate, triethyloxoniumtetrafluoroborate and also boron trifluoride and its complexes, for example with phosphoric acid, acetic acid (1:1 and 1:2), methanol, diethyl ether, tetrahydrofuran, phenol, ethylene glycol monoethyl ether, polyethylene glycol (molecular weight 200), dimethyl sulfoxide, di-n-butyl ether, di-n-hexyl ether, succinic acid and aliphatic, cycloaliphatic and araliphatic amines and also nitrogen heterocyclics.

Preferably, $BF_3$-benzylamine, $BF_3$-monoethylamine, $BF_3$-propylamine and $BF_3$-butylamine are used. 100 to 1, preferably 15 to 2, mmol of the $BF_3$-amine complex are used per g equivalent of a hydroxyl group to be reacted with one g equivalent of an epoxy group. The reaction of the hydroxyl groups with the epoxy groups can be carried out in the temperature range from 20° to 200° C. The reaction temperature depends on the respective $BF_3$-amine complex.

For example, the reaction temperature when using $BF_3$-monoetylamine or $BF_3$-benzylamine is around 130° C. The mixtures of hydroxyl group-containing and epoxy group-containing compounds that are to be reacted are therefore expediently heated up to that temperature at which the reaction proceeds at a sufficient rate, i.e. within 30 minutes to 15 hours. The reaction is conveniently monitored from the increase in the epoxy equivalent, which indicates a reduction in the number of epoxy groups. The reaction can be terminated by cooling below the reaction temperature.

Suitable polyepoxy compounds (c) are a large number of the compounds known for this purpose, which on average contain more than one epoxy group, preferably 2 epoxy groups, per molecule. These epoxy compounds (epoxy resins) may be saturated, unsaturated and also aliphatic, cycloaliphatic, aromatic or heterocyclic and may also have hydroxyl groups. They may furthermore contain substituents that do not cause any interfering secondary reactions under the mixing or reaction conditions, for example alkyl or aryl substituents, ether groups and the like. Preferred compounds are glycidyl ethers derived from polyhydric phenols, in particular bisphenols and also novolaks and whose epoxy equivalent weights are in the range from 160 to 500, in particular however from 160 to 200.

Examples of polyhydric phenols that may be mentioned include: resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1ethane, bis(4-hydroxyphenyl)-1,1-isobutane, bis(4-hydroxy-tert-butylphenyl)-2,2-propane, bis(2hydroxynaphthyl)methane, 1,5-dihydroxynaphthalene, tris(4-hydroxyphenyl)methane, bis(4-hydroxyphenyl)ether, bis(4-hydroxyphenyl)sulfone and the like, and also the chlorination and bromination products of the aforementioned compounds. Particular preference is given to liquid diglycidyl ethers based on bisphenol A having an epoxy equivalent weight of 180 to 190.

Polyglycidyl ethers of polyalcohols may also be used, for example ethanediol-1,2-diglycidyl ether, butanediol diglycidyl ether, neopentylglycol diglycidyl ether, hexanediol diglycidyl ether, polypropylene glycol diglycidyl ether, polyethylene glycol diglycidyl ether, mixed polyethylenepropylene glycol diglycidyl ethers, glycidyl ethers of glycerol, trimethylolpropane and pentaerythritol.

In special cases there may be used, in addition to the polyglycidyl ethers, small amounts of reactive diluents, for example butyl glycidyl ether, ethylhexyl glycidyl ether, long-chain aliphatic glycidyl ethers, monoglycidyl ethers of a higher isomeric alcohol mixture, phenyl glycidyl ether, cresyl glycidyl ether and p-tert-butylphenyl glycidyl ether in amounts of up to 30%, preferably 10–20%, based on polyglycidyl ethers.

Furthermore, polyglycidyl esters of polycarboxylic acids may also be used which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are adipic acid diglycidyl ester, phthalic acid diglycidyl ester and hexahydrophthalic acid diglycidyl ester.

A detailed list of suitable epoxy compounds is given in the handbook "Epoxidverbindungen und Epoxidharze" [Epoxide Compounds and Epoxy Resins] by A.

M. Paquin, Springer Verlag, Berlin 1958, Chapter IV, and in Lee Neville "Handbook of Epoxy Resins", 1967, Chapter 2. Reference is also made here to EP-A 272 595 and 286 933.

Mixtures of several epoxy resins may also be used.

The polyalkylene polyether polyols (d) are preferably polyether polyols (polyalkylene glycols) having mean molecular weights ($M_w$; gel permeation chromatography: polystyrene standard) of preferably from 200 to 20,000, in particular 200 to 8000. These polyether polyols may contain primary and/or secondary hydroxyl groups, preferably only terminal primary hydroxyl groups. Examples that may be mentioned here are block polymers of ethylene oxide and propylene oxide and also polyethylene, polypropylene, and polybutylene glycols, mixtures of the respective polyalkylene glycols also being able to be used.

In order to prepare the hardeners according to the invention, in general the polyamidoamines (A) and the polyamines (B) are mixed, and the adduct (C) of polyepoxy compounds (c) and polyalkylene polyols (d) is added thereto at 20° to 200° C., preferably at 40° to 120° C., batchwise or by continuous addition over 0.3 to 10 hours, preferably over 0.3 to 3 hours. The reaction takes place in bulk, i.e. in the absence of water or organic solvents. After the end of the reaction, the reaction mixture is diluted with water to a water content of from 20 to 90, preferably 50 to 85 % by weight. The amounts of the respective starting components A, B and C are chosen so that the hydrogen equivalent weight (HEW) in the case of component (B) is 0.5 to 20, preferably 1 to 10, and the epoxy equivalent weight (EEW) in the case of component (C) is 0.1 to 10, preferably 0.5 to 1.5, in each case based on a HEW value of 1 for the component (A).

In some cases it may also be expedient first of all to react the polyamidoamine (A) with the adduct (C) and then to add the polyamine (B) to the reaction product of (A) and (C), or to react the polyamine (B) with the adduct (C) and then add the polyamidoamine (A) to this reaction product of (B) and (C).

Sometimes it may be necessary to add diluents, in general in amounts of from 1 to 40, preferably 5 to 20%, based on the aqueous hardener solution. Examples of diluents that may be mentioned include organic solvents such as ethylene glycol monoethers or diethers, propylene glycol monoethers or diethers, and butylene glycol monoethers or diethers of monoalcohols having an unbranched or branched alkyl radical containing 1 to 6 carbon atoms, tetrahydrofuran, aliphatic alcohols containing unbranched or branched alkyl radicals having 1 to 12 carbon atoms, such as methanol, ethanol, propanol, butanol, araliphatic or cycloaliphatic alcohols such as benzyl alcohol or cyclohexanol, (cyclo)aliphatic or aromatic hydrocarbons, such as hexane, heptane, cyclohexane, toluene, xylols, Solvesso ® or ketones such as acetone, methyl isobutyl ketone and cyclohexanone. The boiling point of these solvents is preferably not above 210° C. Mixtures of the various diluents may also be used.

Hydroxyl group-containing solvents such as benzyl alcohol, 2-methylbenzyl alcohol, 1-phenylethanol, 2-phenoxyethanol, furfuryl alcohol, pine oil and alcohols having 2 to 18 carbon atoms, such as n-butanol, ethylhexyl alcohol, ethylene glycol monoethyl ether, ethylene glycol monomethyl ether and methoxypropanol, ethoxypropanol generally have an accelerating effect on the curing reaction.

The hardeners according to the invention are suitable for curing polyfunctional epoxy compounds, in particular for curing aqueous epoxy resins and aqueous epoxy resin dispersions.

The hardeners according to the invention may also contain further conventional additives, for example accelerators or curing catalysts, further hardeners and additional curable resins or extender resins, and also conventional paint additives such as pigments, pigment pastes, anti-oxidants, flow control agents or thickeners (thixotropic agents), defoaming agents and/or wetting agents, reactive thinners, fillers, flame retardants and the like. These additives may if desired not be added to the curable mixtures until immediately before the processing.

As accelerators or curing catalysts, in addition to the above hydroxyl group-containing solvents there may for example also be used phenols and alkylphenols having 1 to 12 carbon atoms in the alkyl group, such as cresol, the various xylenols, nonylphenol, polyphenols, such as bisphenol A and F, OH group-containing aromatic carboxylic acids such as salicylic acid, benzoic acid, phydroxybenzoic acid, and also tertiary amines such as dimethylaminobenzylamine, 1,3,5-tris(dimethylamino)phenol and the like.

Suitable additional hardeners include the conventional epoxy hardeners, such as basic hardeners (amine hardeners), for example polyamines, Mannich bases and adducts of polyamines (in excess) with polymers, such as polyepoxides; there may also be used phenol-modified amine hardeners and also conventional polyamidoamines or polyimidazolines, which are prepared by condensation of monobasic fatty acids and/or polymeric fatty acids obtained by catalytic polymerization of monounsaturated or polyunsaturated fatty acids or by copolymerization of polymerizable compounds such as styrene. Reference may be made for example to EP-A 272 595 as regards further conventional hardeners.

Additionally, curable resins include for example hydrocarbon resins, phenoxy resins, phenolic resins, polyurethane resins, polysulfides (thiokols), reactive, liquid polymers of butadiene and corresponding acrylonitrile/butadiene copolymers (Hycar types) while as conventional extender resins there may be mentioned, inter alia, non-reactive epoxy resin modifiers, tars, phthalic acid esters and coumarone oils.

Suitable fillers include for example quartz powder, silicates, chalk, gypsum, barytes, titanium dioxide, carbon black, metal powder, organic and inorganic fibers, and the like.

The hardeners are preferably not mixed with the epoxy compounds, aqueous epoxy resins or aqueous epoxy resin dispersions until immediately before use.

Thanks to their outstanding applicational properties mentioned above, the hardeners according to the invention in combination with suitable epoxy resins and additives are suitable for preparing coatings, intermediate coats, paints, molding compositions and curable materials for a very wide range of applications. They may be used for example in the preparation of protective and/or decorative coatings on a very wide range of substrates, in particular rough and porous substrates, such as wood, mineral substrates (e.g. concrete and stone), glass, plastics (e.g. polyethylene, polypropylene, etc.), composite materials, ceramics and treated or untreated metals.

In particular, they are suitable for end uses in which a high elasticity combined with good adhesion is required, and the processing is to be performed in combination with water-thinnable epoxy systems, preferably epoxy resin dispersions. They are therefore particularly suitable for producing water-thinnable adhesives and for painting plastics parts. They may also be used as binders for textile, organic and/or inorganic materials and as additives for plastics cements.

In the case where they are used as a coating agent or as a predominantly water-based paint, application to the substrate is effected by conventional methods, for example brushing, spraying, dipping or rolling.

EXAMPLES

I. Preparation of the Polyamidoamines (A)

1. 595 g (4.37 mol) of m-xylylenediamine are added under a nitrogen atmosphere to 1234 g (1.96 mol) of polyglycolic diacid (about 10-12—O—$CH_2$—$CH_2$— units; acid number about 179 mg KOH/g) in a four-necked flask provided with stirrer, thermometer and distillation apparatus. The temperature rises to about 80° C. as a result of the exothermic reaction. The reaction mixture is heated further to 150° C. within 30 minutes and kept at 150° C. for 1 hour, during which distillation of water commences. The reaction mixture is then heated to 170° C. over two hours and kept at this temperature for 6 hours. The condensation product has an acid number of <1 mg KOH/g, an amine number of 145 mg KOH/g and a viscosity of 2900 mPa.s (25° C.). The hydrogen equivalent weight (HAW) is 183.

2. 704 g (4.13 mol) of isophoronediamine are reacted with 1296 g (2.06 mol) of polyglycolic diacid (about 10-12 —O—$CH_2$—$CH_2$— units; acid number about 179 mg KOH/g), corresponding to Example 1. The condensation product has an acid number of 1.3 mg KOH/g, an amine number of 128 mg KOH/g, and a viscosity of 7480 mPa.s (25° C.). The HAW is 233.

II. Polyepoxide-Polyalkylene Polyether Polyol 1. 1200 g of polyethylene glycol 1000 (2.4 gram equivalent) are heated to 80° C. under a nitrogen atmosphere in a four-necked flask provided with stirrer, thermometer and distillation apparatus, with 1920 g of a bisphenol A epoxy resin having an epoxy equivalent weight (EEW) of 183 (10.49 gram equivalents), following which 6.2 g of Anchor 1040 ($BF_3$-amine complex) are added. The reaction mixture is now heated to 160° C. over 3 hours and kept at this temperature, and after one hour at 160° C. the EEW is 400. The temperature is raised to 170° C. within 30 minutes, 0.4 g of Anchor 1040 is added, and the reaction mixture is kept for one hour at this temperature. The EEW is now 417. The heating is switched off and 164 g of water are added after the temperature has fallen to 85° C. The viscosity of this 95% polyepoxide-polyethylene glycol adduct is 7420 mPa.s (25° C.). The EEW is 446 (424 based on solids).

III. Hardener (according to the invention)

1. 484 g of the polyepoxide-polyalkylene polyether polyol from Example II are added over 1.5 hours under a nitrogen atmosphere to 102 g of m-xylylenediamine (3.0 gram equivalents H), 170 g of isophoronediamine (4.0 gram equivalents H), 183 g of the polyamidoamine from Example I.1 (1.0 gram equivalent of H) and 12.5 g of water in a four-necked flask provided with stirrer, thermometer and distillation apparatus. The temperature of the reaction mixture rises to about 60° C. A further 18.6 g of water are added and the temperature is raised to 80° C. over 1 hour. After the reaction mixture has been kept at this temperature for 3 hours the heating is switched off and the mixture is diluted with 174 g of water. The hardener had the characteristics given in Table 1.

The hardeners according to Examples 2 to 7 are prepared in a similar manner to Example III.1 in the equivalent ratios given in Table 3.

In Examples 6 and 7 the polyamidoamine from Example I.2 is used.

The results given in Table 2 show that coatings prepared using the hardeners according to the invention have in particular a high water resistance. In addition, these dispersions exhibit a very good stability in dilute solution.

NOTES ON TABLE 2

1. The dust dryness is determined according to DIN 53 150 (measurement of the degree of dryness of coatings, degree of dryness 1).

2. The freedom from tack is measured according to DIN 53 150 (degree of dryness 3).

3. The pot life is determined with contrast cards (test cards 2854 from Byk Gardner GmbH). Application of 200 μm wet film, measurement of the reduction in gloss every 15 minutes at a 60° angle in a Byk-micro-TRI-gloss, the pot life being defined as the time after which a reduction in gloss to below 95% occurs.

4. Haze is based on a varnish film kept for 24 hours at 20° C. and 35 % relative humidity; evaluation according to DIN 53 230: 0=very good, 5=very poor.

5. Pendulum hardness according to König (DIN 53 157)

6. Films after 24 hours in water; evaluation according to DIN 53 230.

7. 20% strength hardener solution is kept at 40° C. and evaluated every 15 minutes for haze and phase separation.

8. Preparation of the varnish films: The 40 % strength hardener solution is mixed with the epoxy resin dispersion and a film is applied with 200 μm clearance (moist) to glass plates and dried at room temperature. The film has a dried layer thickness of about 50 μm.

TABLE 1

| Hardeners according to the invention | Example | 1 | 2 | 3 | 4 | 5 | 6 | 7 |
|---|---|---|---|---|---|---|---|---|
| m-xylelenediamine (HEW = 34.0) | g.equiv.H. | 3.0 | 2.5 | 2.0 | 1.5 | 1.0 | 3.0 | 2.0 |
| Isophoronediamine (HEW = 42.6) | g.equiv.H. | 4.0 | 4.0 | 4.0 | 4.0 | 4.0 | 4.0 | 4.0 |
| Polyamidoamine (A) according to Example I.1. (HEW = 183) | g.equiv.H. | 1.0 | 1.5 | 2.0 | 2.5 | 3.0 | — | — |
| Polyamidoamine (A) according to Example I.2. (HEW = 233) | g.equiv.H. | — | — | — | — | — | 1.0 | 2.0 |
| Polyepoxide-polyalkylenepoly-etherpolyol (C) according to Example II.1. EEW 420 | g.equiv. | 1.15 | 1.15 | 1.10 | 1.15 | 1.10 | 1.10 | 1.10 |

TABLE 1-continued

| Hardeners according to the invention | Example | 1 | 2 | 3 | 4 | 5 | 6 | 7 |
|---|---|---|---|---|---|---|---|---|
| HEW (based on 80% strength solution) | | 166 | 185 | 193 | 212 | 220 | 175 | 215 |
| Viscosity at 25° C. of the 80% strength solution | mPa · s | 10880 | 11310 | 9340 | 7420 | 7940 | 10460 | 9230 |
| Water diluability[1] | 80% | 0 | 0 | 0 | 0 | 0 | 0 | 0 |
| | 60% | 0 | 0 | 0 | 0 | 0 | 0 | 0 |
| | 40% | 0 | 0 | 0 | 0 | 0 | 0 | 0 |
| | 20% | 2 | 2 | 2 | 2 | 2 | 2 | 2 |

[1] Evaluation according to DIN 53 230

TABLE 2

| | | 1 | 2 | 3 | 4 | 5 | 6 | 7 |
|---|---|---|---|---|---|---|---|---|
| Aqueous epoxy resin dispersion Example | | 1 | 2 | 3 | 4 | 5 | 6 | 7 |
| Hardener Example | | 1 | 2 | 3 | 4 | 5 | 6 | 7 |
| Weight portion of 40% strength hardener solution | g | 20 | 20 | 20 | 20 | 20 | 20 | 20 |
| Weighed portion of epoxy resin dispersion VEP 2385 ® HOECHST AG, EEW 510 on solids | g | 52 | 48.8 | 44.5 | 42.2 | 40.6 | 51.3 | 41.6 |
| Solids content of the EP dispersion | % | 56.5 | 56.5 | 56.5 | 56.5 | 56.5 | 56.5 | 56.5 |
| Film testing[8] | | | | | | | | |
| Dust dryness[1] | after h | 2.5 | 2.5 | 3.0 | 4.0 | 4.0 | 0.8 | 1.5 |
| Freedom from tack[2] | after h | 6 | 7.5 | 8.0 | 9.0 | 9.0 | 5.5 | 6.0 |
| Pot life[3] | h | 1.3 | 1.5 | 1.7 | 2.0 | 2.2 | 1.75 | 2.5 |
| Haze[4] | | 0–1 | 0–1 | 0–1 | 0–1 | 1 | 0–1 | 1 |
| Pendulum hardness[5] | (24 h) s | 145 | 126 | 119 | 106 | 97 | 141 | 124 |
| | (48 h) s | | | | | | | |
| Water resistance[6] | | 1–2 | 1–2 | 1–2 | 1–2 | 1–2 | 1–2 | 1–2 |
| Pendulum hardness after[5] water storage | (after h) s | 74(24) | 68(24) | 63(24) | 58(24) | 52(24) | 75(24) | 66(24) |
| Stability of a 20% strength hardener solution at 40° C. | h | 0.75–1 | >48 | >48 | >48 | >48 | 0.5 | 0.5–0.75 |

We claim:

1. A hardener for epoxy resins, obtained by reacting together the following distinct components
   (A) polyamidoamines that were obtained by polycondensation of
      (a) dicarboxylic acids containing oxyalkylene groups, or their anhydrides, halides or esters with
      (b) polyamines containing at least two amino groups capable of undergoing condensation with (a),
   (B) polyamines containing at least two secondary amino groups, and reaction products of (C) polyepoxy compounds and (D) polyalkylene polyether polyols, which are formed by ring opening of epoxy groups and formation of ether linkages.

2. A hardener as claimed in claim 1, wherein compounds of the formula (I)

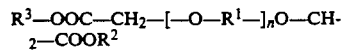

used as compound (a) are those in which
$R^1$ is an alkylene radical having 2 to 5 carbon atoms;
$R^2$ is, each independently of one another, hydrogen or an alkyl radical having 1 to 6 carbon atoms;
n is 0 or an integer from 1 to 300.

3. A hardener as claimed in claim 2, wherein $R^1$ in formula (I) is an ethylene radical and n is 1 to 50.

4. A hardener as claimed in claim 1, wherein the compounds (a) used are 3,6-dioxaoctanedioc acid, 3,6,9-trioxaundecandioic acid or polyglycolic diacid having a molecular weight of from 400 to 600, and the polyamines (b) used are 2-methylpentamethylenediamine, diethylenetriamine, triethylenetetramine, isophoronediamine, m-xylylenediamine or trimethylhexamethylenediamine.

5. A hardener as claimed in claim 1, wherein the amines (B) are selected from the group consisting of aliphatic, cycloaliphatic, heterocyclic and araliphatic polyamines containing at least 2 secondary amino groups.

6. A hardener as claimed in claim 1, wherein the amines used as (b) are 2-methylpentamethylenediamine, diethylenetriamine, triethylenetetramine, isophoronediamine, m-xylylenediamine or trimethylhexamethylenediamine.

7. A hardener as claimed in claim 1, wherein reaction products of polyepoxy compounds (C) and polyalkylene polyether polyols (D), obtained by reacting C and D in the equivalent ratio 2:(0.1 to 1.5), are used.

8. A hardener as claimed in claim 1, wherein the reaction products of (C) and (D) have a means molecular weight Mn of 200 to 20,000.

9. Aqueous epoxy resin dispersions containing a hardener as claimed in claim 1.

10. A hardener as claimed in claim 1 wherein the polyamines (b) have the formula

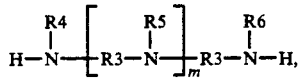

in which $R^3$ is a divalent hydrocarbon of 1 to 20 carbon atoms selected from the group consisting of alkylene of 1 to 12 carbon atoms, cycloalkylene of 5 to 12 carbon atoms, and aralkylene of 7 to 12 carbon atoms; $R^4$, $R^5$ and $R^6$ are individually selected from the group consisting of hydrogen, and monovalent hydrocarbon of 1 to 20 carbon atoms optionally interrupted by hetero atoms; or $R^4$ and $R^5$ together form a ring system of 3 to 8 carbon atoms; and m is 0 or an integer from 1 to 8.

* * * * *